(12) United States Patent
Leete et al.

(10) Patent No.: US 6,728,801 B2
(45) Date of Patent: Apr. 27, 2004

(54) METHOD AND APPARATUS FOR PERIOD PROMOTION AVOIDANCE FOR HUBS

(75) Inventors: Brian A. Leete, Beaverton, OR (US); John I. Garney, Portland, OR (US)

(73) Assignee: Intel Corporation, Santa Clara, CA (US)

(*) Notice: Subject to any disclaimer, the term of this patent is extended or adjusted under 35 U.S.C. 154(b) by 325 days.

(21) Appl. No.: 09/895,126

(22) Filed: Jun. 29, 2001

(65) Prior Publication Data

US 2003/0005182 A1 Jan. 2, 2003

(51) Int. Cl.[7] .................................................. G06F 3/05
(52) U.S. Cl. ............................ 710/54; 710/39; 710/55; 711/171
(58) Field of Search ................................ 710/1, 10, 36, 710/52, 53–57, 112, 127, 7, 29, 30, 35, 39, 74; 712/225; 711/100, 171

(56) References Cited

U.S. PATENT DOCUMENTS

| | | | | |
|---|---|---|---|---|
| 6,061,687 A | * | 5/2000 | Wooten | 707/101 |
| 6,119,190 A | * | 9/2000 | Garney | 710/127 |
| 6,169,748 B1 | * | 1/2001 | Barbas et al. | 370/468 |
| 6,256,315 B1 | * | 7/2001 | Barbas et al. | 370/412 |
| 6,349,354 B1 | * | 2/2002 | Garney | 710/127 |
| 6,404,735 B1 | * | 6/2002 | Beshai et al. | 370/230 |
| 6,525,253 B1 | * | 2/2003 | Kikuchi et al. | 84/601 |

* cited by examiner

*Primary Examiner*—Rehana Perveen
*Assistant Examiner*—Rijui Mai
(74) *Attorney, Agent, or Firm*—Blakely, Sokoloff, Taylor & Zafman LLP

(57) ABSTRACT

A device is presented including a host controller capable of attaching a quantity of queue heads to a frame list. The quantity of queue heads are attached to the frame list before any transaction descriptors. Further presented is a method including determining whether a queue head has less than or equal to a predetermined packet size and whether a period is one of greater than and equal to a predetermined schedule window. The method includes storing contents of a current entry in a frame list in a next pointer in the queue head. Also replacing the current entry in the frame list with a pointer to a new queue head. Many queue heads are directly coupled to the frame list.

10 Claims, 11 Drawing Sheets

| 31 30 29 28 27 26 25 24 23 22 21 20 19 18 17 16 | 15 14 13 12 11 10 9 8 | 7 | 6 5 4 3 2 1 0 | |
|---|---|---|---|---|
| Buffer Pointer (Page 0) | Device Address | | EndPt | 27-24H |
| Buffer Pointer (Page 1) | Maximum Packet Size | I/O | R | 2B-28H |
| Buffer Pointer (Page 2) | Reserved | | Mult | 2F-2CH |
| Buffer Pointer (Page 3) | Reserved | | | 33-30H |
| Buffer Pointer (Page 4) | Reserved | | | 37-34H |
| Buffer Pointer (Page 5) | Reserved | | | 3B-38H |
| Buffer Pointer (Page 6) | Reserved | | | 3F-3CH |

FIG. 6B

METHOD AND APPARATUS FOR PERIOD PROMOTION AVOIDANCE FOR HUBS

BACKGROUND OF THE INVENTION

1. Field of the Invention

This invention relates to universal serial bus (USB) environments, and more particularly to a method and apparatus to improve performance of an enhanced host controller interface (EHCI) for USB devices.

2. Description of the Related Art

In many of today's processors and systems, such as personal computer (PC) systems, there exist USB ports for connecting various USB devices. Many USB devices are frequently used by PC users. For example, USB devices may be printers, compact disc read-only memory (CD-ROM) drives, CD-ROM writer (CDRW) drives, digital versatile disc (DVD) drives, cameras, pointing devices (e.g., computer mouse), keyboards, joy-sticks, hard-drives, speakers, etc.

Different standards of USB technology have different bandwidths. For example, Universal Serial Bus Specification, revision 1.1, Sep. 23, 1998 (USB 1.1) devices are capable of operating at 12 Mbits/second (Mbps), and Universal Serial Bus Specification, revision 2.0, Apr. 27, 2000 (USB 2.0; also known as high-speed USB) devices are capable of operating at 480 Mbps. USB 2.0 defines a multiple speed-signaling environment where a single high-speed bus may support one or more USB 1.1 classic busses through a USB 2.0 hub (Transaction Translator). In this environment, system software (the Host Controller Driver) must allocate and manage the bandwidth of USB 1.1 classic busses.

The Enhanced Host Controller Interface (EHCI) specification for a Universal Serial Bus, revision 0.95, Nov. 10, 2000, describes the register-level interface for a Host Controller (HC) for USB 2.0. In the USB EHCI specification, a single data structure known as the interrupt queue head is defined. The interrupt queue head represents and manages traffic to interrupt endpoints behind a given transaction translator (TT). A timed event, known as period promotion, may consume up to 255× the typical bandwidth of interrupt queue heads. Therefore, period promotion consumes a large portion of bandwidth in a USB 2.0 system. Thus, period promotion is very costly in a USB 2.0 system in terms of bandwidth usage.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIGS. 6A–B illustrates a structure of a isochronous transfer descriptor (iTD).

DETAILED DESCRIPTION OF THE INVENTION

The invention generally relates to an apparatus and method to improve bandwidth usage of Universal Serial Bus (USB) devices. Referring to the figures, exemplary embodiments of the invention will now be described. The exemplary embodiments are provided to illustrate the invention and should not be construed as limiting the scope of the invention.

Figure 1:
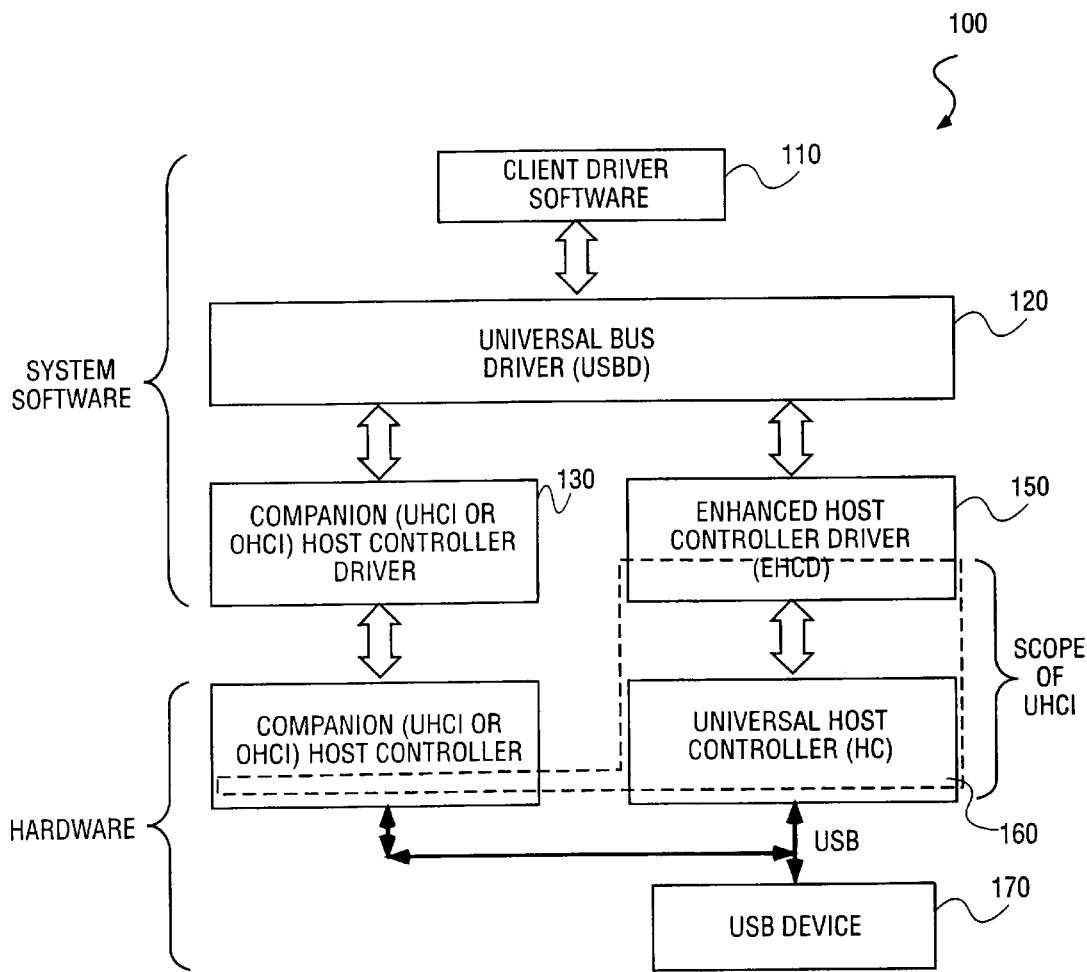
FIG. 1 illustrates a Universal Serial Bus (USB) system.

A typical USB host system is composed of a number of hardware and software layers. FIG. 1 illustrates a block diagram of typical building block layers in a USB 2.0 system. System 100 is comprised of client driver software 110, universal bus driver (USBD) 120, companion host controller (HC) driver 130, companion HC 140, enhanced host controller driver (EHCD) 150, universal host controller (UHC) 160 and USB device 170. In system 100, system software consists of client driver software 110, USBD 120, companion HC driver 130, and EHCD 150. In system 100 the hardware comprises companion HC 140, UHC 160, and USB device 170.

Client driver software 110 typically executes on the host PC corresponding to a particular USB device. Client driver software 110 is typically part of the operating system (OS) or may be provided with a USB device. USBD 120 is a system bus driver that abstracts the details of the particular HC driver for a particular OS. Companion HC driver 130 is typically a UHC interface (UHCI) driver or an open HCI (OHCI) driver for USB. The HC driver provides a software layer between specific HC hardware and the USBD. Companion HC 140, is typically UHCI or OHCI standards. Companion HC 140 is the specific hardware implementation of the HC. There is one HC specification for USB 2.0 functionality, and two specifications for full-and low-speed HCs.

Figure 2:
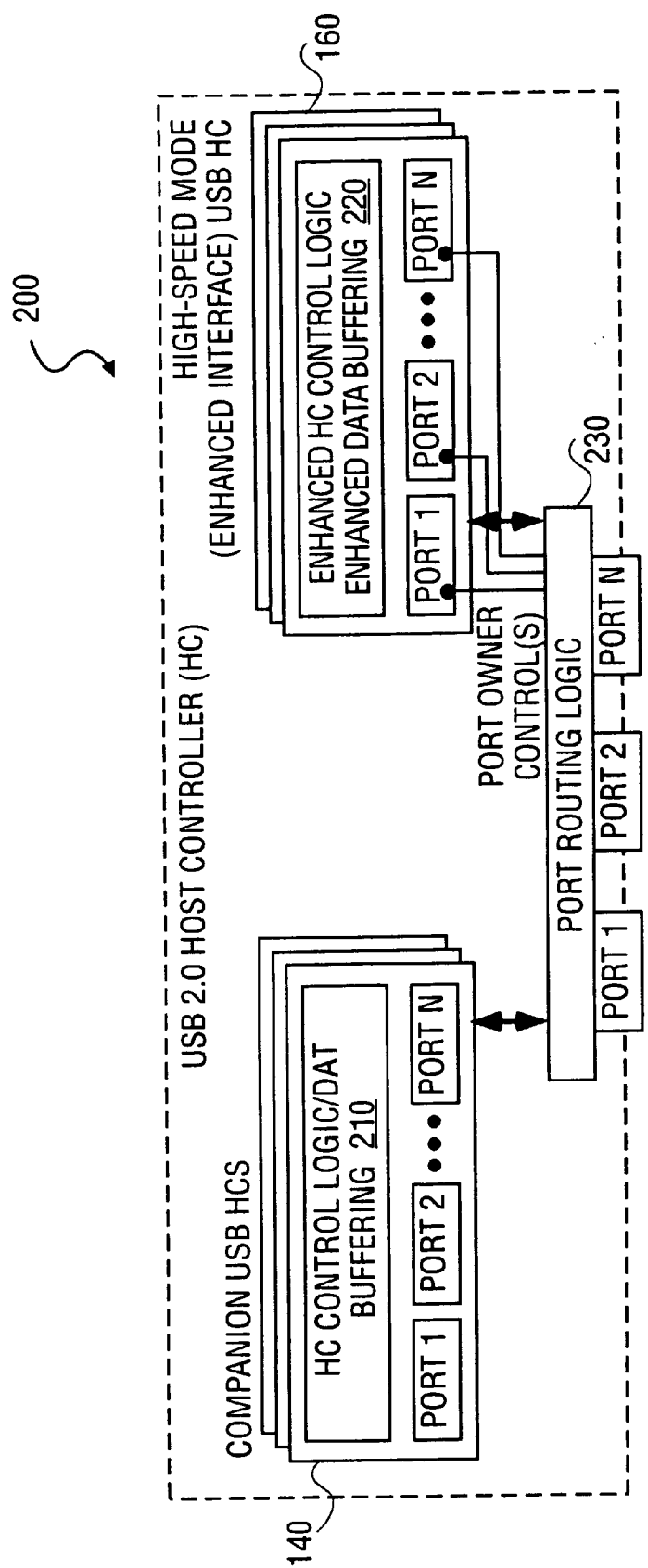
FIG. 2 illustrates a USB host controller.

FIG. 2 illustrates typical USB 2.0 HC 200. A USB 2.0 HC includes one high-speed mode HC and zero (0) or more USB 1.1 HCs. USB 2.0 HC 200 comprises companion USB HC and high-speed mode (enhanced interface) HC 160. Companion HC 140 comprises HC control logic/data buffering 210 (including port 1 through port N). High-speed mode HC 160 comprises enhanced HC control logic/enhanced data buffering 220 (including port 1 through port N). Also included in USB 2.0 HC 200 is port routing logic 230 (including port 1 through port N).

Figure 3:
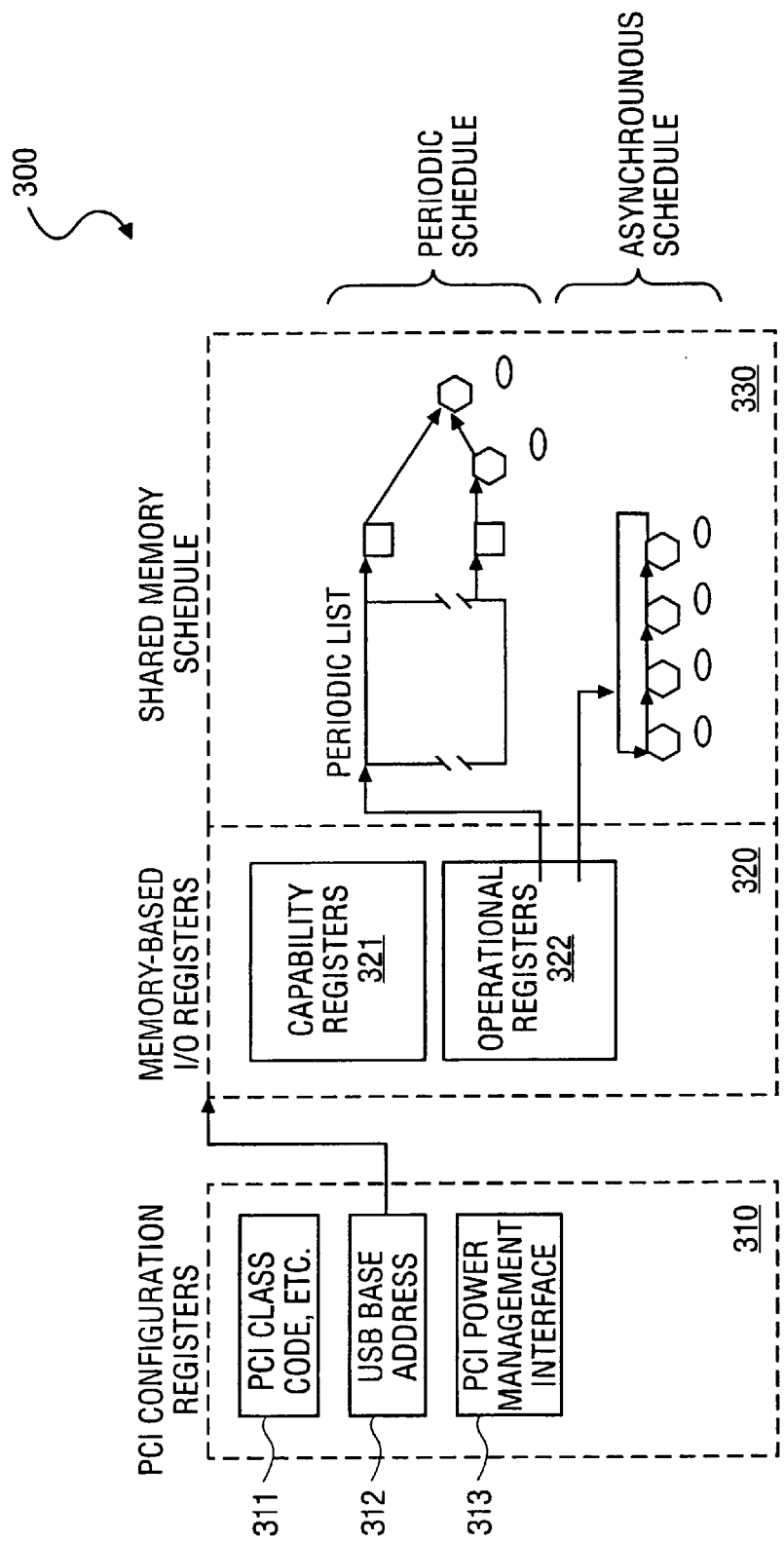
FIG. 3 illustrates an enhanced host controller interface (EHCI).

FIG. 3 illustrates the general architecture of enhanced host controller interface (EHCI) 300. EHCI 300 comprises three interface spaces: peripheral component interconnect (PCI) configuration 310, register 320, and schedule interface 330. PCI configuration 310 includes PCI registers used for system component enumeration and PCI power management. PCI configuration registers in PCI configuration 310 comprise PCI class code 311, USB base address 312, and PCI power management interface 313. Register 320 comprises memory based input/output (I/O) registers. Memory based I/O registers are comprised of capability registers 321 and operational registers 322. Register 320 must be implemented as memory-mapped I/O. Schedule interface 330 is typically memory allocated and managed by the HC driver for the periodic and asynchronous schedules. EHCI 300 allows software to enable or disable each schedule.

Figure 4:
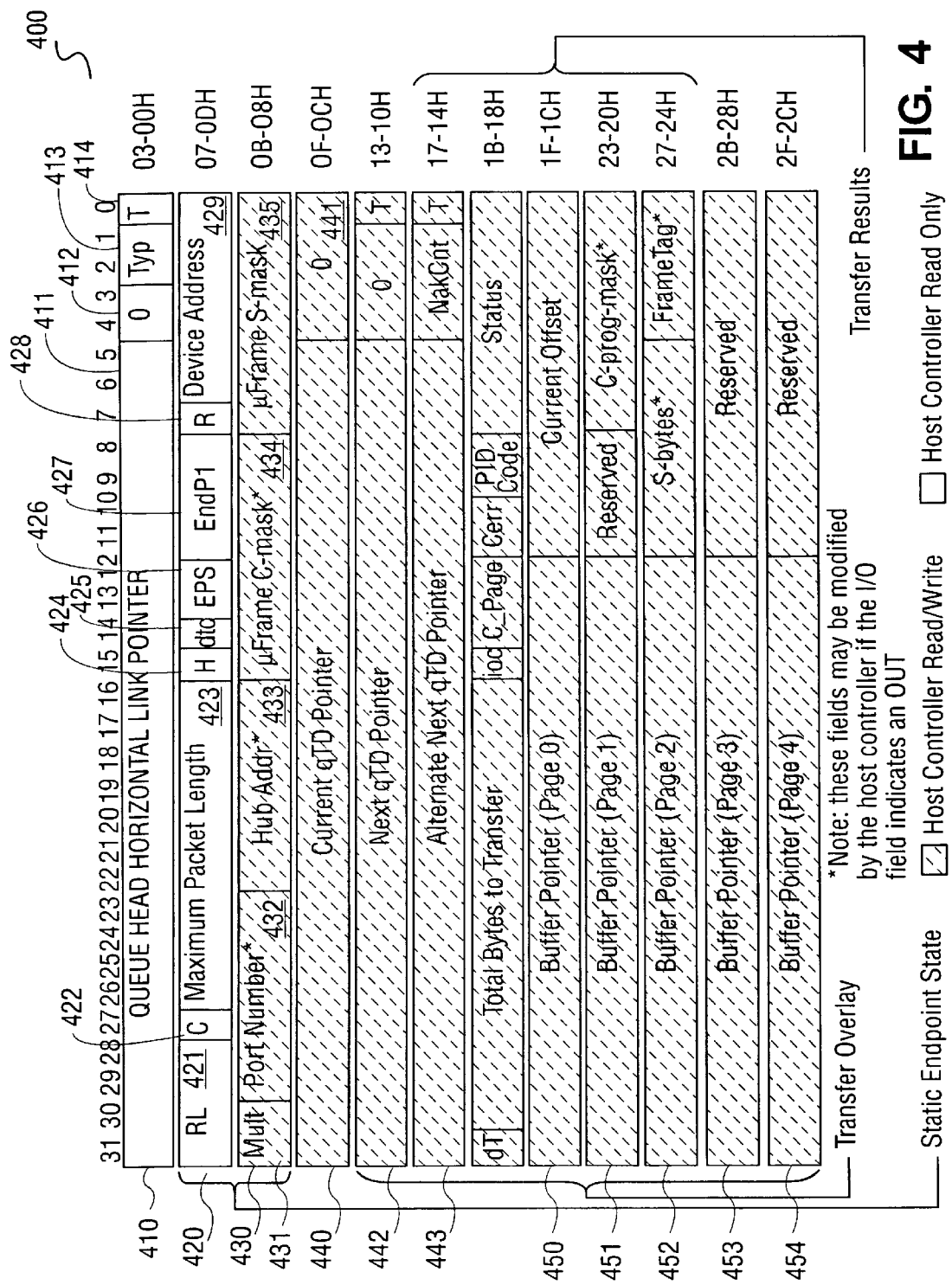
FIG. 4 illustrates a queue head structure layout.

FIG. 4 illustrates a typical structure layout of a queue head. Queue head horizontal link pointer (QHLP) 410 comprises four fields. QHLP field 411 contains the address of the next data object to be processed in the horizontal list and corresponds to memory address signals [31:5], respectively. Field 412 is reserved, and bits 4:3 must be written as Os. Field 413 comprising bits 2:1, indicates to the hardware whether the item referenced by the link pointer is a isochronous transaction descriptor (iTD), split transaction isochronous transaction descriptor (siTD) or a queue head. Field 413 allows the HC to perform the proper type of processing on the item after it is fetched. Field 14, bit 0, is the terminate field. If the queue head is in the context of the periodic list, a set (1) bit in field 414 indicates to the HC that this is the end of the periodic list. This bit, however, is ignored by the HC when the queue head is in the asynchronous schedule.

Field 420 illustrates queue head DWord1, and field 430 illustrates end point characteristics comprising queue head DWord2. Field 421 is the not acknowledged or negative acknowledged (Nak) count re-load field. Field 421 contains a value, which is used by the HC to reload Nak counter field. Field 433 illustrates a control end-point flag. Field 423 represents the maximum packet length. The maximum packet length directly corresponds to the maximum packet size of the associated endpoint. The maximum value of field 423 is 0×400 (1024).

Field 424 illustrates head of reclamation list flag. Field 424 is set by system software to mark a queue head as being the head of the reclamation list. Field 425 illustrates data toggle control. Field 425 specifies where the HC should get the initial data toggle on an overlay transition. Field 426 illustrates endpoint speed. Field 426 is the speed of the associated endpoint. Field 427 illustrates the endpoint number. Field 427 selects the particular endpoint number on the device serving as the data source or sink. Field 428 is a reserved bit. Field 429 illustrates the device address. Field 429 selects the specific device serving as the data source or sink.

Field 431 illustrates the high-bandwidth pipe multiplier. Field 431 is a multiplier used to key the HC as the number of successive packets the HC may submit to the endpoint in the current execution. The HC makes the simplified assumption that software properly initializes this field. Field 432 illustrates the port number. Field 432 is ignored by the HC unless field 426 indicates a full-speed or low-speed device. The value is the port number identifier on the USB 2.0 hub, below which the full- or low-speed device associated with this endpoint is attached. This information is used in the split-transaction protocol. Field 433 illustrates the hub address. Field 433 is ignored by the HC unless field 426 indicates a full- or low-speed device. The value is the USB device address of the USB 2.0 hub below which the full- or low-speed device associated with this endpoint is attached.

Field 434 illustrates the split-completion mask. Field 434 is ignored by the HC unless field 426 indicates the device is a low- or full-speed device and this queue head is in the periodic list. Field 434 is used to determine during which micro-frames the HC should execute a complete-split transaction. When the criteria for using this field are met, a zero value in this field has undefined behavior. Field 435 illustrates the interrupt schedule mask. Field 435 is used for all endpoint speeds. When the queue head is on the asynchronous schedule, software should set this field to a zero. A non-zero value in this field indicates an interrupt endpoint.

Field 440 illustrates the current queue transaction descriptor link pointer. Field 440 contains the address of the current transaction being processed in this queue and corresponds to memory address signals [31:5], respectively. Field 441 is reserved for future use. Field 442 illustrates the next qTD pointer. Field 443 illustrates the alternate next qTD pointer. Fields 450 through 454 illustrate buffer pointer pages 0–4, respectively.

Figure 5:
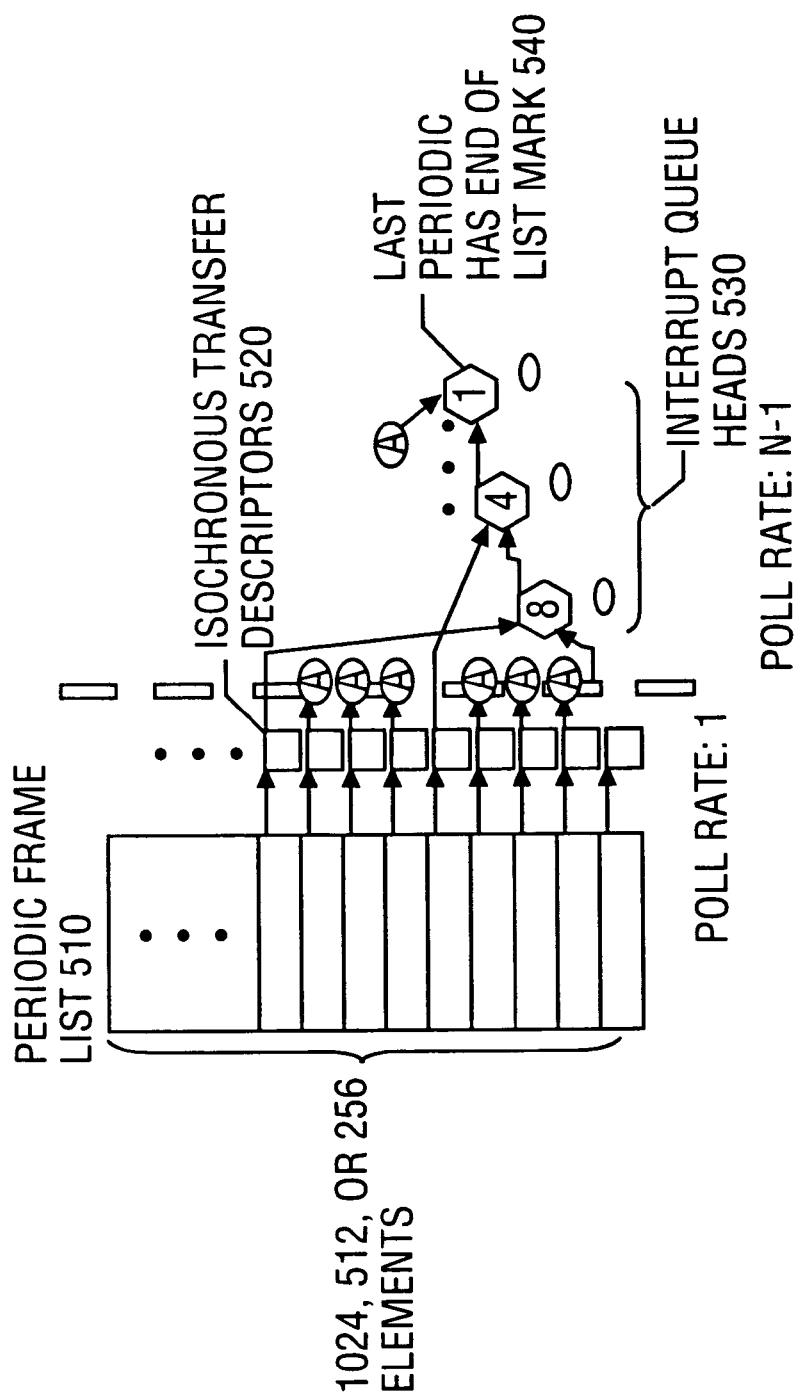
FIG. 5 illustrates a periodic schedule.

FIG. 5 illustrates an example of a periodic schedule. The periodic schedule is used to manage all isochronous and interrupt transfer streams. The base of the periodic schedule is periodic frame list 510. Software links schedule data structures to periodic frame list 510 to produce a graph of scheduled data structures. The graph represents the appropriate sequence of transactions on the USB. Periodic schedule 500 also illustrates isochronous transfers, (using iTDs and siTDs) with a period of one, linked directly to periodic frame list 510. Interrupt transfers (are managed with queue heads) and isochronous streams, with periods other than one, are linked following the period-one iTD/siTDs. Interrupt queue heads 530 are linked into periodic frame list 510 ordered by poll rate. Longer poll rates are linked first (e.g. closest to periodic frame list 510), followed by shorter poll rates, with queue heads with a poll rate of one (1), on the very end.

Figure 6A:
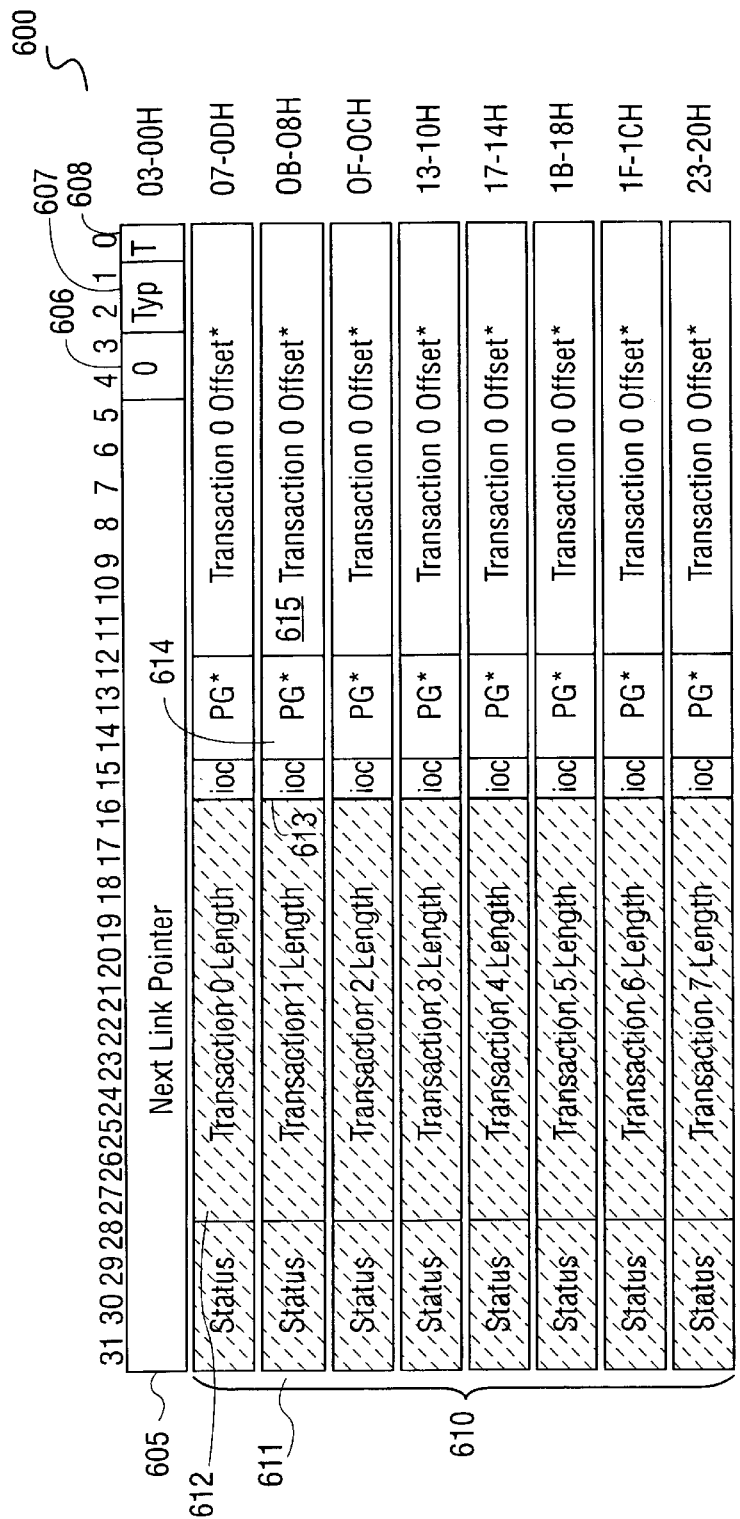

FIGS. 6A–B illustrates the structure of an iTD. The structure illustrated in FIGS. 6A–B is used only for high-speed isochronous endpoints. All other transfer types should use queue structures. Link pointer 605 is a pointer to the next schedule data structure (iTD, siTD, or queue head. Field 606 is reserved. Field 606 indicates to the HC whether the item referenced is a iTD, siTD, or a queue head. By informing the HC of the type of data structure, the HC can perform the proper type of processing on the item after it is fetched. Field 611 records the status of the transaction executed by the HC for the particular slot. Field 612 is the transaction length (i.e. number of data bytes) the HC will send during the transaction. Field 613 is the interrupt on complete (IOC) bit. If the IOC bit is set to a one ("1"), it specifies that when the transaction completes, the HC should issue an interrupt at the next interrupt threshold. Field 614 is the page select.

The page select field 614 are set by software to indicate which of the buffer page pointers the offset field 615 in the particular slot should be concatenated to produce the beginning memory address for the particular transaction. Offset field 615 is a value that is an offset, expressed in bytes, from the beginning of a buffer. Offset field 615 is concatenated onto the buffer page pointer indicated in the page select field 614 to produce the beginning buffer address for the particular transaction. Buffer page pointer list 620 provides 7 page pointers to support the expression of eight ("8") isochronous transfers. The seven pointers allow for three ("3") transactions * 1024 (maximum packet size)* eight ("8") transaction records (24,576 bytes) to be moved with this data structure, regardless of the alignment offset of the first page.

Figure 7:
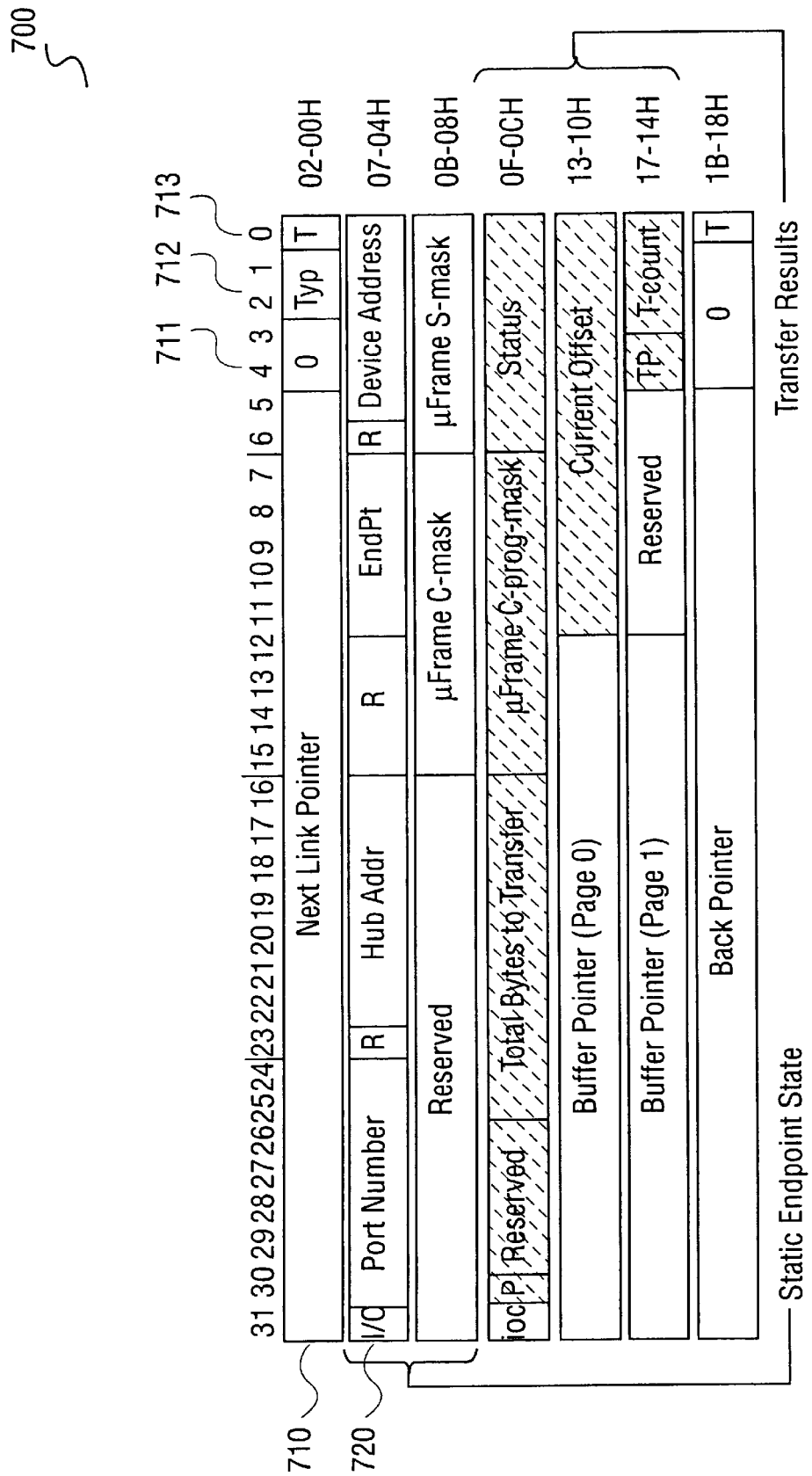
FIG. 7 illustrates a structure of a split-transaction isochronous transfer descriptor (siTD).

FIG. 7 illustrates a siTD. All full-speed isochronous transfers through transaction translators (TTs) are managed using the siTD data structure. Field 710 is the next link pointer. Field 710 contains the address of the next data object to be processed in the periodic list and corresponds to memory address signals [31:5], respectively. Field 715 is the QH/(s)iTD select. Field 715 indicates to the HC whether the item referenced is a iTD/siTD or QH. Field 716 is the terminate field. Field 717 is reserved.

Field 720 is the direction, that is input or output. Field 720 encodes whether the full-speed transaction is IN or OUT. Field 721 is the port number of the recipient TT. Field 722 is reserved. Field 723 is the device address of the TT's hub. Field 724 is reserved. Field 725 is a four-bit field that selects the particular endpoint number on the device serving as the data source or sink. Field 726 is reserved. Field 727 selects the specific device serving as the data source or sink.

Field 730 is reserved. Field 731, the split completion mask, and field 732, the split start mask, are used to determine during which micro-frames the HC should execute complete-split transactions. Field 740 is the interrupt on complete field. When field 740 is set to a one (1), the HC will assert a hardware interrupt at the next interrupt threshold when the HC determines that the split transaction has completed. When field 740 is set to a zero (0), the HC will not assert an interrupt when the HC determines that the split transaction has completed. Field 741 is sued to indicate which data page pointer should be concatenated with field 751 (discussed below) to construct a data buffer pointer. Field 742 is reserved. Field 743 is initialized to the total number of bytes expected in the transfer (maximum value is 1023). Field 743 is used by the HC to record which split-completes have been executed. Field 744 records the status of the transaction executed by the HC for this slot.

Field 750 is the buffer pointer list for page 0. Field 751 is the current offset field. In field 751, the twelve least significant bits of the Page 0 pointer is the current byte offset for the current page pointer. Field 760 is the buffer pointer list for Page 1. Field 761 is reserved. Field 762 is the transaction position. Field 762 is used with field 763 to determine whether to send all, first, middle, or last with each outbound transaction payload. Field 763 is initialized by software with the number of OUT start-splits the transfer requires. Field 770 is the siTD back pointer. Field 770 is a physical memory pointer to an siTD. Field 771 is reserved. Field 772 is a terminate field.

Figure 8:
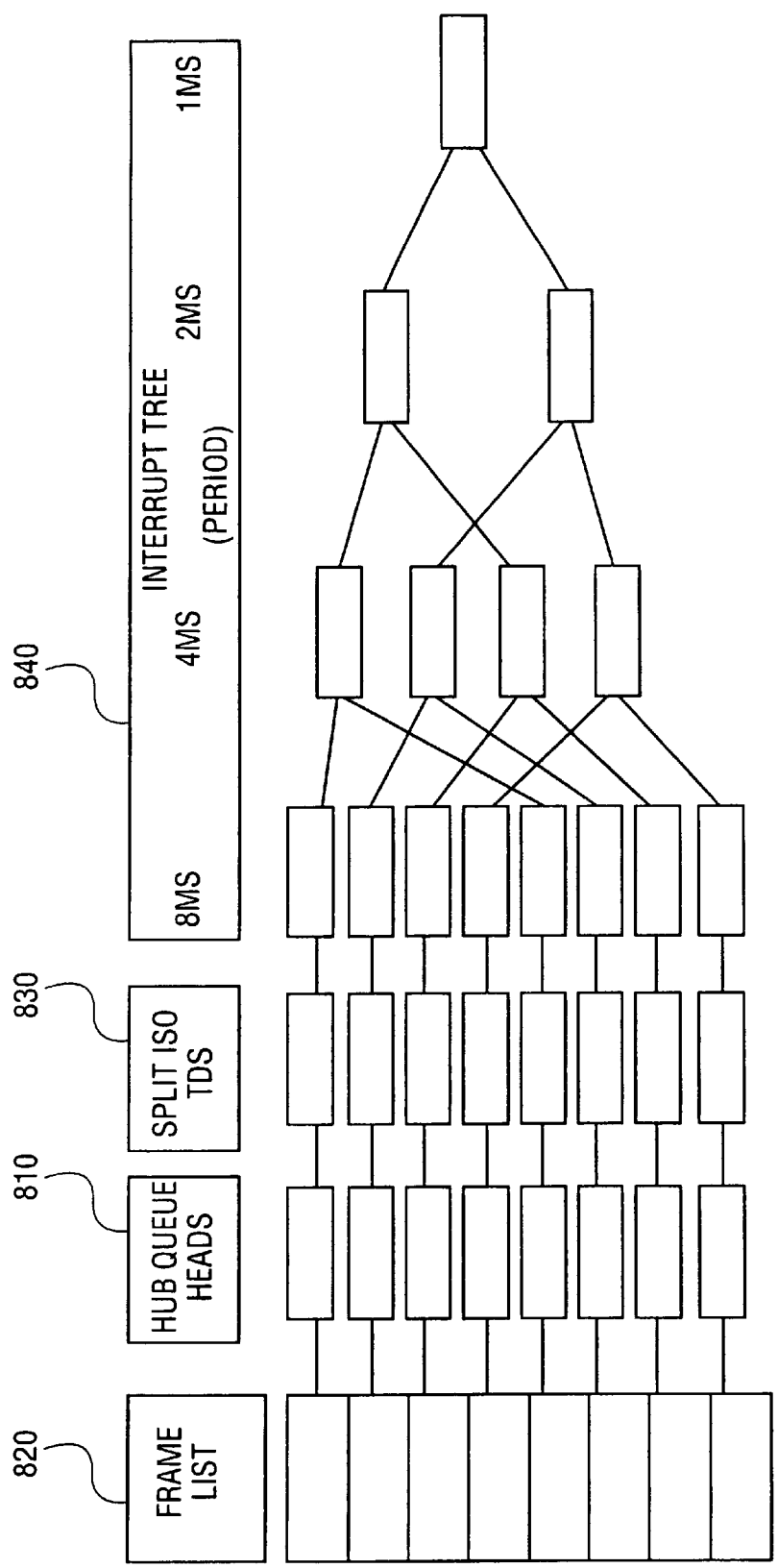
FIG. 8 illustrates an embodiment of the invention having queue heads coupled directly to a frame list.

FIG. 8 illustrates a resulting frame list of an embodiment of the invention that couples interrupt queue heads directly to the HC frame list, but before any siTDs in a USB 2.0 system. Note that embodiments of the invention can be used with future USB systems where queue heads are typically not directly coupled to the frame list before siTDs. One should note that the FIG. 8 is an example with only eight ("8") elements in the frame list, but the invention is not limited to eight ("8") elements. In this embodiment of the invention, interrupt queue heads 810 are not part of the standard interrupt tree. An example of a standard interrupt tree can be seen in FIG. 5.

In FIG. 5, it can be seen that iTDs 520 are directly coupled to periodic frame list 510. In FIG. 5, interrupt queue heads 530 are part of the interrupt tree. In this embodiment of the invention, by coupling interrupt queue heads 810 directly to frame list 820, where the coupled interrupt queue heads are coupled before split iTDs 830, interrupt queue heads 810 are not subject to period promotion. In this embodiment of the invention, the HC Driver maximizes the number of devices using periodic (isochronous and interrupt) endpoints that can be connected to a TT. By preventing period promotion, this embodiment of the invention uses less of the available bandwidth on a USB 2.0 system.

Figure 9:
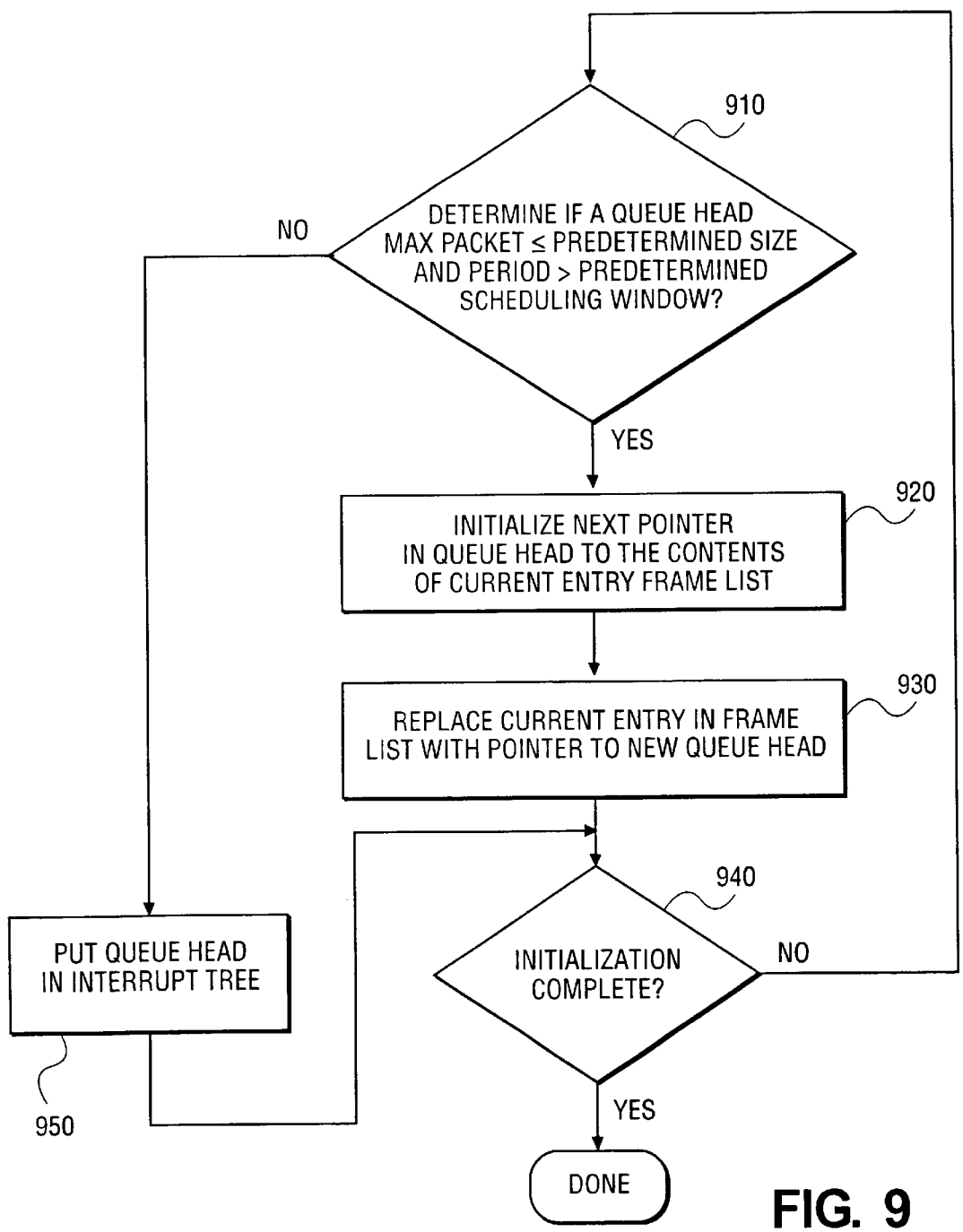
FIG. 9 illustrates a block diagram of an embodiment of the invention having queue heads coupled directly to a frame list during initialization.

FIG. 9 illustrates a block diagram of an embodiment of the invention having process 900 that couples queue heads directly to a frame list during initialization. Block 910 determines whether a queue head max packet size is less than or equal to a predetermined size (such as one ("1") byte) and that the period is greater or equal to a predetermined schedule window (dependent on number of data structures, such as iTD and siTD). In one embodiment of the invention, block 910 also determines whether the queue head is full speed or not. Note that the queue heads can be of any sufficiently small maximum packet size that allows sufficient bandwidth to remain for a maximum sized (1023 bytes per frame) full speed isochronous transfer.

If block 910 determines that a queue head max packet size is not equal to or less than a predetermined size and/or that the period is not greater or equal to a predetermined schedule window, then process 900 continues with block 950. Block 950 places the queue head in the interrupt tree. Process 900 then continues to block 940. Process 900 continues with block 940 that determines whether initialization is complete or not (i.e., all queue heads are processed). If block 940 determines that all queue heads are not processed, then process 900 continues with block 910. If block 940 determines that all queue heads are processed, process 900 completes.

If block 910 determines that a queue head max packet size is less than or equal to a predetermined size and that the period is greater or equal to a predetermined schedule window, then process 900 continues with block 920. Block 920 initializes the next pointer in the queue head to contain the contents of the current entry in the frame list. Process 900 continues with block 930 that replaces the current entry in the frame list with a pointer to a new queue head. Process 900 then continues with block 940.

Figure 10:
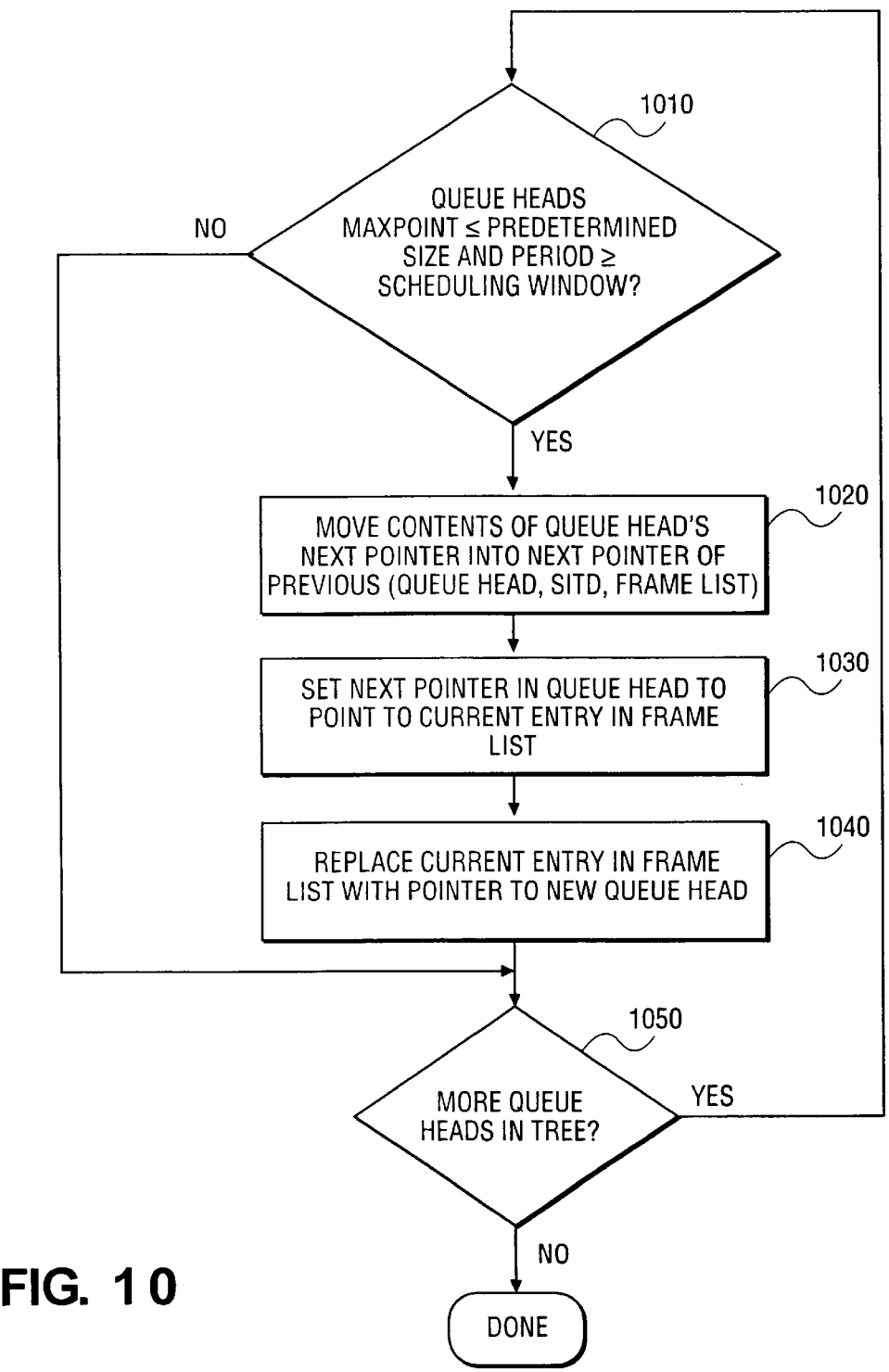
FIG. 10 illustrates a block diagram of an embodiment of the invention having queue heads coupled directly to a frame list after initialization.

FIG. 10 illustrates a block diagram of an embodiment of the invention having process 1000 that couples queue heads directly to a frame list after initialization of the interrupt tree. Block 1010 determines whether a queue head maximum packet size is less than or equal to a predetermined size (such as one ("1") byte) and that the period is greater or equal to a predetermined schedule window (dependent on number of data structures, such as iTD and siTD). In one embodiment of the invention, block 1010 also determines whether the queue head is full speed or not. Note that the queue heads can be of any sufficiently small maximum packet size that allows sufficient bandwidth to remain for a maximum sized (1023 bytes per frame) full speed isochronous transfer.

If block 1010 determines that a queue head max packet size is not less than or equal to a predetermined size and/or that the period is not greater or equal to a predetermined schedule window, then process 1000 continues with block 1050. Block 1050 determines whether more queue heads exist in the interrupt tree. If block 1050 determines that more queue heads exist in the interrupt tree, process 1000 continues with block 1010. If block 1050 determines that there are not any more queue heads in the interrupt tree, process 1000 is complete.

If block 1010 determines that a queue head max packet size is less than or equal to a predetermined size and that the period is greater or equal to a predetermined schedule window, then process 1000 continues with block 1020. Block 1020 initializes the next pointer in the queue head to contain the contents of the current entry (queue head, iTD, siTD) in the frame list. Process 1000 continues with block 1030 that replaces the next pointer of the queue head to point to the current entry in the frame list. Process 1000 then continues with block 1040. Block 1040 replaces the current entry in the frame list with a pointer to a new queue head. Process 1000 then continues with block 1050.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.). The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:

determining whether a queue head has one of less than a predetermined packet size and equal to the predetermined packet size and whether a period is one of greater than and equal to a predetermined schedule window;

storing contents of a current entry in a frame list in a next pointer in the queue head; and replacing the current entry in the frame list with a pointer to a new queue head, wherein a plurality of queue heads are directly coupled to the frame list before any split-isochronous transaction descriptors where split-isochronous transaction descriptors are supported.

2. The method of claim 1, wherein the predetermined packet size is one byte.

3. The method of claim 1, wherein the predetermined schedule window is determined during initialization of a host controller.

4. The method of claim 3, wherein the host controller is coupled to a host controller driver.

5. The method of claim 1, wherein the plurality of queue heads are directly coupled to the frame list during initialization of a host controller.

6. An apparatus comprising a machine-readable medium containing instructions which, when executed by a machine, cause the machine to perform operations comprising:

determining whether a queue head has one of less than a predetermined packet size and equal to the predetermined packet size and whether a period is one of greater than and equal to a predetermined schedule window;

storing contents of a current entry in a frame list in a next pointer in the queue head; and replacing the current entry in the frame list with a pointer to a new queue head, wherein a plurality of queue heads are directly coupled to the frame list before any split-isochronous transaction descriptors where split-isochronous transaction descriptors are supported.

7. The apparatus of claim 6, wherein the predetermined packet size is one byte.

8. The apparatus of claim 6, wherein the predetermined schedule window is determined during initialization of a host controller.

9. The apparatus of claim 6, wherein the host controller is coupled to a host controller driver.

10. The apparatus of claim 6, wherein the plurality of queue heads are directly coupled to the frame list during initialization of a host controller.

* * * * *